United States Patent Office 3,101,349
Patented Aug. 20, 1963

3,101,349
OPTIONALLY 17-ALKYLATED 17-OXYGENATED-2-OXAANDROSTANES AND INTERMEDIATES
Raphael Pappo, Skokie, and Christopher Jung, Morton Grove, Ill., assignors to G. D. Searle & Co., Chicago, Ill., a corporation of Delaware
No Drawing. Filed May 7, 1962, Ser. No. 193,008
7 Claims. (Cl. 260—345.2)

This invention is concerned with novel steroidal ethers of the androstane series and more particularly, with 2-oxa-5α-androstanes of the structural formula

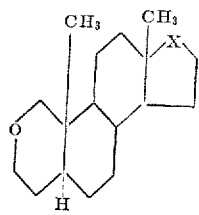

wherein X represents a carbonyl, β-hydroxymethylene, α-(lower alkyl)-β-hydroxymethylene, or α-(lower alkynyl)-β-hydroxymethylene radical.

Representative of the lower alkyl radicals denoted above are methyl, ethyl, propyl, butyl, pentyl, hexyl, and the branched-chain radicals isomeric therewith, while the lower alkynyl radicals symbolized in the X term are typified by ethynyl, propynyl, butynyl, pentynyl, hexynyl, and the branched-chain radicals thereof.

The compounds of the present invention can be conveniently manufactured by utilizing as starting materials, 17-oxygenated-5α-androst-1-en-3-ones of the structural formula

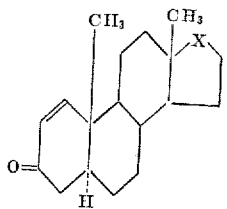

wherein X is indicative of a carbonyl, β-hydroxymethylene, or α-(lower alkyl)-β-hydroxymethylene substituent. The reaction of these materials with a suitable oxidizing agent such as ozone, lead tetracetate with osmium tetroxide, or an alkali metal chlorate with osmium tetroxide, followed by lead tetracetate cleavage, affords the corresponding 1,2-seco-A-nor compounds of the structural formula

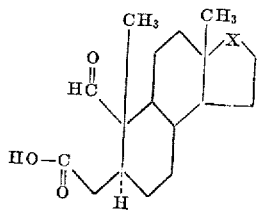

These intermediates are converted, by reaction with a suitable reducing agent, to the corresponding 17-oxygenated 2-oxa-5α-androstan-3-ones of the structural formula

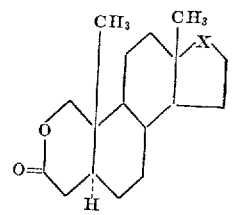

The latter lactones are reduced, typically by low temperature reaction with sodium borohydride in the presence of boron trifluoride, or, alternatively, with lithium aluminum hydride at elevated temperature, to afford the corresponding 1,2-diols of the structural formula

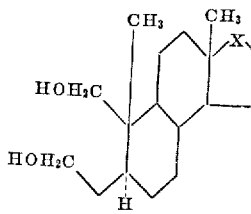

These diols are converted to the 2-oxa compounds of this invention by dehydration, for example by heating in a suitable inert solvent in the presence of an acidic catalyst. As a specific example of the aforementioned processes, 17β-hydroxy-17α-methyl-5α-androst-1-en-3-one is contacted with lead tetracetate and osmium tetroxide in aqueous acetic acid, resulting in 17β-hydroxy-17α-methyl-1-oxo-1,2-seco-A-nor-5α-androstan-2-oic acid. An aqueous slurry of this substance, made alkaline with sodium hydroxide, is contacted with sodium borohydride to produce 17β-hydroxy-17α-methyl-2-oxa-5α-androstan-3-one. A solution of that lactone in tetrahydrofuran is allowed to react with lithium aluminum hydride at the reflux temperature, thus providing 17α-methyl-1,2-seco-A-nor-5α-androstane-1,2,17β-triol, which compound is contacted with p-toluenesulfonyl chloride in pyridine at about 0° to yield 17α-methyl-2-oxa-5α-androstan-17β-ol.

When the above sequence of reactions is applied to 17β-hydroxy-5α-androst-1-en-3-one, the resulting compound of this invention is 2-oxa-5α-androstan-17β-ol. Oxidation of that substance, typically with aqueous chromic acid, affords 2-oxa-5α-androstan-17-one.

The 17α-alkylated compounds of this invention, wherein the alkyl group contains more than one carbon atom, can be produced alternatively from the aforementioned 2-oxa-5α-androstan-17-one. Reaction of that substance with a lower alkyne affords the corresponding 17α-alkynyl compounds of the structural formula

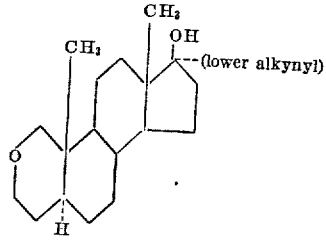

Reduction of the alkynyl moiety to an alkyl group can be effected, for example, by catalytic reduction. As an illustration of the latter processes, 2-oxa-5α-androstan-17-one is allowed to react with acetylene in the presence of a potassium hydroxide catalyst to afford 17α-ethynyl-2-oxa-5α-androstan-17β-ol. Catalytic hydrogenation in the presence of 5% palladium-on-carbon produces 17α-ethyl-2-oxa-5α-androstan-17β-ol.

The compounds of this invention display valuable pharmacological properties. They are hormonal agents for example, as is evidenced by their ability to produce anabolic, androgenic, and progestational responses.

The invention will appear more fully from the examples which follow. These examples are given by way of illustration only and are not to be construed as limiting the invention either in spirit or in scope. Temperatures are given in degrees centigrade (° C.), and quantities of materials in parts by weight unless otherwise noted.

*Example 1*

To a solution of 8 parts of 5α-androst-1-ene-3,17-dione in 120 parts of acetic acid containing 15 parts of water is added 50 parts of lead tetracetate and 0.75 part of osmium tetroxide. This reaction mixture is stirred for about 4 hours at room temperature, then is stored at room temperature for about 16 hours, and finally is extracted with benzene. The benzene solution is washed with water, and extracted with aqueous potassium bicarbonate. The aqueous extracts are acidified with dilute hydrochloric acid, then extracted with a mixture of ethyl acetate and benzene. This organic extract is washed with water, dried over anhydrous sodium sulfate, and evaporated to dryness at reduced pressure. The resulting residue is dissolved in 20 parts of pyridine, then treated with 10 parts of 20% aqueous sodium bisulfite. This mixture is stirred for about 20 minutes at room temperature, then is diluted with water and extracted with ethyl acetate. The aqueous layer is separated and acidified by means of dilute sulfuric acid, and this acidic mixture is extracted with benzene. The benzene solution is washed with water, dried over anhydrous sodium sulfate, and concentrated to dryness in vacuo to afford 1,17-dioxo-1,2-seco-A-norandrostan-2-oic acid.

To a solution of 2 parts of 1,17-dioxo-1,2-seco-A-norandrostan-2-oic acid in 20 parts of water containing 4 parts of 20% aqueous sodium hydroxide is added a solution of 10 parts of sodium borohydride in 80 parts of water. This mixture is stored at room temperature for about 24 hours, then it is washed with ether and acidified with aqueous hydrochloric acid. The resulting mixture is extracted with ethyl acetate-ether, and the layer is separated, washed successively with aqueous potassium carbonate and water, dried over anhydrous sodium sulfate, then evaporated to dryness at reduced pressure. The crystalline residue is triturated with ether, then recrystallized from butanone to afford pure 17β-hydroxy-2-oxa-5α-androstan-3-one, M.P. about 198–203°.

*Example 2*

To a solution of 6.36 parts of 17β-hydroxy-17α-methyl-5α-androst-1-en-3-one in 95 parts of acetic acid and 12 parts of water is added 40 parts of lead tetracetate and 0.6 part of osmium tetroxide. This mixture is stored at room temperature for about 24 hours, then is treated with 2 parts of lead tetracetate. Evaporation to dryness at reduced pressure affords a residue, which is extracted with benzene. The benzene extract is washed with water, and extracted with aqueous potassium bicarbonate. The aqueous extract is washed with ether, acidified with dilute sulfurous acid, then extracted with ethyl acetate-benzene. This organic extract is washed with water, dried over anhydrous sodium sulfate, and concentrated to dryness in vacuo. To a solution of the residual crude product in 20 parts of pyridine is added 10 parts of 20% aqueous sodium bisulfite and the mixture is stirred for about 20 minutes at room temperature. This mixture is then diluted with water, washed with ethyl acetate, acidified with dilute sulfuric acid, and finally extracted with benzene. The benzene extract is washed with water, dried over anhydrous sodium sulfate, and evaporated to dryness at reduced pressure to produce crude 17β-hydroxy-17α-methyl-1-oxo-1,2-seco-A-nor-5α-androstan-2-oic acid, which after recrystallization from aqueous isopropyl alcohol, melts at about 166–173° (dec.).

An aqueous slurry of 6 parts of 17β-hydroxy-17α-methyl-1-oxo-1,2-seco-A-nor-5α-androstan-2-oic acid in 200 parts of water is made alkaline to pH 10 by the addition of dilute aqueous sodium hydroxide, then is treated with 6 parts of sodium borohydride. This mixture is allowed to react at room temperature for about 3 hours. Benzene is added and the resulting mixture is acidified carefully with dilute hydrochloric acid. The benzene layer is separated, and the aqueous layer is further extracted with benzene. The combined benzene extracts are washed successively with aqueous potassium bicarbonate and water, dried over anhydrous sodium sulfate, then evaporated to dryness in vacuo. The resulting residue is triturated with ether to afford pure 17β-hydroxy-17α-methyl-2-oxa-5α-androstan-3-one, M.P. about 235–238°; $[\alpha]_D = -23°$ (chloroform).

*Example 3*

To a mixture of 3.5 parts of sodium borohydride, 44.4 parts of tetrahydrofuran, and 47.5 parts of diethylene glycol dimethyl ether is added, slowly with stirring at 0–5°, a slurry of 10 parts of 17β-hydroxy-2-oxa-5α-androstan-3-one in 105 parts by volume of boron trifluoride etherate. Stirring is continued under nitrogen for about 4 hours, after which time water is added slowly and the resulting aqueous mixture is extracted with benzene. The benzene layer is separated, washed with 10% aqueous sodium hydroxide, and stripped of solvent at reduced pressure. To this residue is added sufficient ethanol and aqueous sodium hydroxide to effect solution, at which point the mixture is strongly basic. This mixture is heated on the steam bath for about 30 minutes, then is concentrated to a small volume at reduced pressure, and the resulting residue is extracted wtih benzene. The organic layer is separated, washed with water, dried over anhydrous sodium sulfate, and stripped of solvent to afford 1,2-seco-A-nor-5α-androstane-1,2,17β-triol. Recrystallization of this material from acetone affords a pure sample melting at about 181–182°.

*Example 4*

A mixture of one part of 1,2-seco-A-nor-5α-androstane-1,2,17β-triol, 0.1 part of p-toluenesulfonic acid, and 196 parts of toluene is stirred and heated for about 2½ hours at such a rate that the solvent distils slowly. At the end of the reaction period, this mixture is washed successively with dilute aqueous sodium hydroxide and water, dried over anhydrous sodium sulfate, and concentrated to dryness at reduced pressure. The residue is crystallized from aqueous isopropyl alcohol, then recrystallized from ether to yield pure 2-oxa-5α-androstan-17β-ol, M.P. about 143–144°. This compound is represented by the structural formula

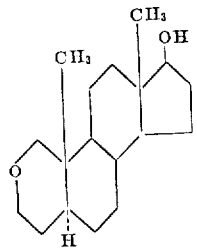

*Example 5*

To a solution of 5 parts of 2-oxa-5α-androstan-17β-ol in 320 parts of acetone is added an aqueous solution, 8 N in chromium trioxide and 8 N in sulfuric acid, until a slight excess of the oxidant is present. The volatile organic material is removed by distillation at reduced pressure and the resulting residue is extracted with benzene, washed successively with water, dilute aqueous sodium hydroxide, and water, then dried over anhydrous sodium sulfate and evaporated to dryness at reduced pressure. To the resulting residue is added 100 parts of methanol and 20 parts of 10% aqueous sodium hydroxide, and this mixture is heated on the steam bath for about 2 minutes. The organic solvent is removed by distillation at reduced pressure, and this residue is dissolved in benzene to afford an organic solution which is washed with water, dried over anhydrous sodium sulfate, and stripped of solvent at reduced pressure. Two successive recrystallizations of this material from hexane affords pure 2-oxa-5α-androstan-17-one, M.P. about 131–133.5°. It is further characterized by the structural formula

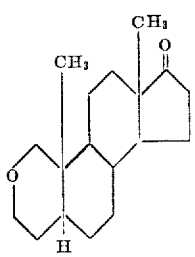

*Example 6*

To a solution of 15 parts of 17β-hydroxy-17α-methyl-2-oxa-5α-androstan-3-one in 1,776 parts of tetrahydrofuran is added 15 parts of lithium aluminum hydride, and this reaction mixture is stirred at room temperature for about 16 hours, then is heated at reflux for about 2 hours. After cooling to about 0°, 16 parts of water followed by 12 parts by volume of 20% aqueous sodium hydroxide and 56 parts of water are added. The resulting inorganic salts which precipitate are removed by filtration, and the filtrate is concentrated to dryness at reduced pressure. Recrystallization from benzene of the resulting residue results in 17α-methyl-1,2-seco-A-nor-5α-androstane-1,2,17β-triol, which substance melts at about 145–146°.

*Example 7*

To a solution of 10 parts of 17α-methyl-1,2-seco-A-nor-5α-androstane-1,2,17β-triol and 20 parts of pyridine is added 6.2 parts of p-toluenesulfonyl chloride, and the resulting reaction mixture is stirred at about 0° for about 3 hours. After completion of the reaction period, a mixture of ice and water is added, and the resulting aqueous mixture is extracted with chloroform. The chloroform layer is separated, washed successively with dilute hydrochloric acid, dilute aqueous potassium bicarbonate, and water, dried over anhydrous sodium sulfate, and evaporated to dryness at reduced pressure. To this residue is added 155 parts by volume of 3% aqueous potassium hydroxide in isopropyl alcohol, and this mixture is heated, under nitrogen, at reflux for about 8 hours. Distillation of the solvent at reduced pressure affords a residue which is extracted with benzene. The benzene extract is washed with water, dried over anhydrous sodium sulfate, and concentrated to afford a crystalline residue. Recrystallization of this residue from aqueous isopropyl alcohol affords 17α-methyl-2-oxo-5α-androstan-17β-ol, which displays a melting point of about 148–149°, and is further characterized by the structural formula

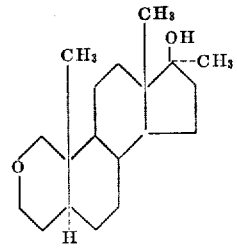

Further purification of this material by absorption on a neutral alumina chromatographic column followed by elution with benzene and recrystallization from aqueous isopropyl alcohol affords a sample of the pure material melting at about 150–151.5°.

*Example 8*

A mixture of 46.6 parts of diethylene glycol dimethyl ether and 1.68 parts of diethylene glycol monoethyl ether is heated to about 135°, at which time 6 parts of potassium hydroxide is added, and the resulting mixture is heated at that temperature for about 30 minutes. Through this reaction mixture, cooled to 0–5° by means of an ice bath, is bubbled a stream of acetylene for about 1½ hours. To the resulting mixture is then added a solution of 1.5 parts of 2-oxa-5α-androstan-17-one in 9.5 parts of diethylene glycol dimethyl ether, and stirring is continued at about 0° for about 4½ hours, during which time the addition of acetylene is continued. At the end of the reaction period, ice is added and the resulting aqueous mixture is extracted with chloroform. The chloroform extract is washed with water, dried over anhydrous sodium sulfate, and concentrated to dryness at reduced pressure. Trituration of the resulting residue from ether affords 17α-ethynyl-2-oxa-5α-androstan-17β-ol, which melts at about 168–175°. Recrystallization first from methylcyclohexane then from isopropyl alcohol yields the pure material, melting at about 178.5–179.5°. This substance is represented by the structural formula

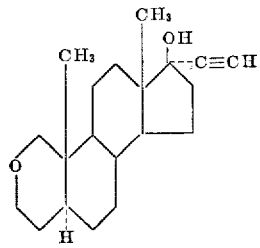

*Example 9*

To a solution of 2.39 parts of 17α-ethynyl-2-oxa-5α-androstan-17β-ol in 160 parts of ethanol is added 2.5 parts of 5% palladium-on-carbon catalyst, and this mixture is shaken in a hydrogen atmosphere at atmospheric pressure until 2 molecular equivalents of hydrogen are absorbed. The catalyst is removed by filtration, and the filtrate is stripped of solvent at reduced pressure to afford a residue which is recrystallized from aqueous isopropyl alcohol, resulting in pure 17α-ethyl-2-oxa-5α-androstan-17β-ol, M.P. about 144–146°. This compound is further characterized by the structural formula

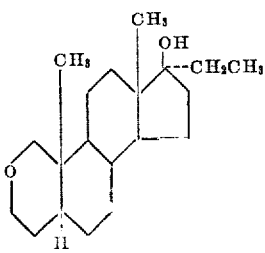

What is claimed is:
1. A compound of the structural formula

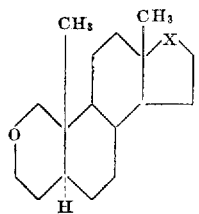

wherein X is selected from the group consisting of carbonyl, β-hydroxymethylene, and α-(lower alkyl)-β-hydroxymethylene radicals.
2. 2-oxo-5α-androstan-17-one.
3. 2-oxo-5α-androstan-17β-ol.

4. A compound of the formula

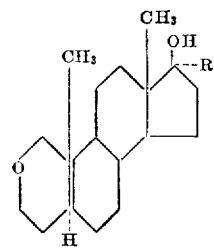

wherein R is a lower alkyl radical.
5. 17α-methyl-2-oxo-5α-androstan-17β-ol.
6. 17α-ethyl-2-oxa-5α-androstan-17β-ol.
7. 17α-ethynyl-2-oxo-5α-androstan-17β-ol.

No references cited.

UNITED STATES PATENT OFFICE
CERTIFICATE OF CORRECTION

Patent No. 3,101,349            August 20, 1963

Raphael Pappo et al.

It is hereby certified that error appears in the above numbered patent requiring correction and that the said Letters Patent should read as corrected below.

Column 7, lines 16 and 17, and column 8, lines 13 and 16, for "2-oxo-", each occurrence, read -- 2-oxa- --; column 8, the first formula should appear as shown below instead of as in the patent:

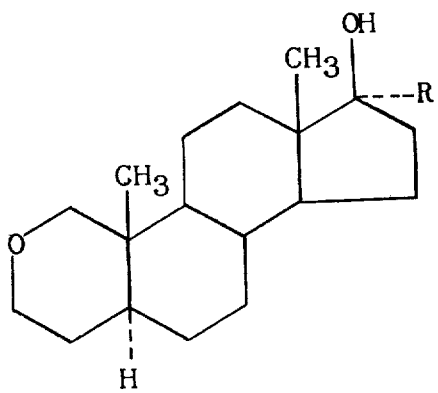

Signed and sealed this 5th day of May 1964.

(SEAL)
Attest:

ERNEST W. SWIDER
Attesting Officer

EDWARD J. BRENNER
Commissioner of Patents